Patented May 13, 1952

2,596,371

UNITED STATES PATENT OFFICE 2,596,371

LEAD, COBALT AND MANGANESE SALTS OF 2,4,4-TRIMETHYL VALERIC ACID

Eric Chadwick, Carshalton, England, assignor to British Industrial Solvents Limited, London, England, a British company No Drawing. Application March 1, 1951, Serial No. 213,458. In Great Britain March 11, 1950

4 Claims. (Cl. 260—429)

This invention relates to novel lead, cobalt and manganese octoates which are suitable for incorporation into paints and varnishes to accelerate the drying of the film.

It is well known that the lead and cobalt salts of ethyl hexoic acid may be employed for this purpose, but they suffer from the disadvantage that the anhydrous salts are not free-flowing but are sticky solids, and, for ease of handling, have to be marketed as concentrates in inflammable liquids such as white spirit.

The object of the invention is to produce driers for paints and varnishes which do not possess these disadvantages, but are, when powdered, free-flowing salts, soluble in white spirit and/or benzene, or other hydrocarbons, which are much easier to handle than the above mentioned isomers.

According to the present invention, lead, cobalt and manganese salts of 2,4,4-trimethyl valeric acid are provided which possess these desirable properties. These salts can readily be provided in a free-flowing state, and they may be marketed as such or in the form of tablets. The salts can readily be prepared by various methods, and conveniently by precipitation from an aqueous solution of the sodium salt of 2,4,4-trimethyl valeric acid with about the stoichiometrical quantity of a water soluble salt of the desired metal. Alternatively, the lead and cobalt salts may be prepared by adding to the 2,4,4-trimethyl valeric acid the required quantity of lead or cobalt oxide, hydroxide, carbonate, acetate, or other salt of a volatile weak acid, and stirring and/or heating the mixture until the reaction is substantially complete.

The following examples illustrate the preparation and use of the novel driers of this invention, the parts being by weight.

Example 1

38 parts of crystalline lead acetate were dissolved in 120 parts of water and the solution was filtered from a small amount of insoluble matter. The filtered solution was then added slowly to a vigorously stirred solution of sodium 2,4,4-trimethyl valerate, and the white slurry thus obtained was stirred vigorously for 1 hour and filtered. The white residue was washed with water and dried in a vaccum desiccator to give 43.5 parts of a white powder, the lead salt of 2,4,4,-trimethyl valeric acid, soluble in benzene and slightly soluble in white spirit, the latter converting it to a white crystalline solid. The solid readily dissolves in hot mineral lubricating oil, giving a solution which, on cooling, sets to a grease.

Example 2

17.7 parts of cobalt acetate were dissolved in 60 parts of water and the solution obtained was added slowly to a vigorously stirred solution of sodium 2,4,4-trimethyl valerate. The purple slurry thus obtained was worked up as described in Example 1 to give 24 parts of a purple powder, the cobalt salt of 2,4,4-trimethyl valeric acid, which was soluble in white spirit and in benzene.

Example 3

Manganese 2,4,4-trimethyl valerate was prepared as described in the previous example except that the cobalt acetate solution was replaced by a solution of 24.1 parts of manganese sulphate in 85 parts of water. 33.5 parts of the manganese salt of 2,4,4-trimethyl valeric acid were obtained as a pale brown powder, readily soluble in white spirit.

Example 4

22 parts of lead monoxide were added to 29 parts of 2,4,4-trimethyl valeric acid and the mixture was slowly stirred and heated in a covered vessel until a transparent, colourless liquid was obtained. On cooling, 47.4 parts of a white, translucent, glassy solid remained. A sample of this salt on standing under white spirit was converted to a white crystalline solid, the lead salt of 2,4,4-trimethyl valeric acid, substantially as described in Example 1.

Example 5

17.7 parts of crystalline cobalt acetate were added to 29 parts of 2,4,4-trimethyl valeric acid, and the mixture was slowly stirred and heated until a deep purple homogeneous mixture was obtained, acetic acid being evolved during the process. On cooling 34.5 parts of the cobalt salt of 2,4,4-trimethyl valeric acid were obtained as a very viscous purple resin which was converted to a purple powder on extraction with a small amount of white spirit.

Example 6

A solution of the cobalt salt of 2,4,4-trimethyl valeric acid was prepared by dissolving the dry salt in commerical grade white spirit to give a concentration equivalent to 6% cobalt. This was compared with a commercial grade of cobalt linoleate solution of the same cobalt content.

The solutions of the two driers were added to varnish grade linseed oil in amounts sufficient to give 0.1% Co on the linseed oil. Films of each preparation were formed by pouring, and were allowed to dry for eight hours at room temperature. Both films had reached the tacky stage at the end of this time, there being no significant difference between them.

*Example 7*

The above solutions of the two driers were added to varnish grade linseed oil diluted with an equal volume of white spirit. The cobalt concentration was again 0.1% based on the linseed oil. No significant difference was observed in the drying rates.

*Example 8*

Linseed stand oil was diluted with an equal volume of white spirit and mixed with the solutions of the driers as in the preceding example. No significant differences were observed between the poured films after eight hours drying. After 7 days drying both had approximately the same degree of hardness.

*Example 9*

The linseed oil samples containing the driers from the last three examples were stored for 9 months. All samples showed clear bright solutions, but some precipitation had taken place, this being rather less in the case of the samples containing cobalt 2,4,4-trimethyl valerate than in those containing cobalt linoleate.

In addition to their use as paint and varnish driers, the novel salts of this invention may be used as stabilisers for certain synthetic resins. For example, the use of the lead salt of 2,4,4-trimethyl valeric acid as a stabiliser for polyvinyl chloride premits the production of a transparent sheet. Other uses are as mould lubricants, and as thickening agents for lubricating oils and greases.

I claim:

1. A member selected from the group consisting of the lead, cobalt and manganese salts of 2,4,4-trimethyl valeric acid.
2. The lead salt of 2,4,4-trimethyl valeric acid.
3. The cobalt salt of 2,4,4-trimethyl valeric acid.
4. The manganese salt of 2,4,4-trimethyl valeric acid.

ERIC CHADWICK.

No references cited.